(No Model.)

N. E. SHONTZ.
VALVE RESEATING DEVICE.

No. 540,196. Patented May 28, 1895.

Witnesses
O. C. Robbins
Thomas Durant

Inventor
Neri E. Shontz

UNITED STATES PATENT OFFICE.

NERI E. SHONTZ, OF ROCHESTER, NEW YORK, ASSIGNOR OF ONE-HALF TO BENJAMIN FRANKLIN, JR., OF SAME PLACE.

VALVE-RESEATING DEVICE.

SPECIFICATION forming part of Letters Patent No. 540,196, dated May 28, 1895.

Application filed January 9, 1895. Serial No. 534,374. (No model.)

*To all whom it may concern:*

Be it known that I, NERI E. SHONTZ, of Rochester, in the county of Monroe and State of New York, have invented certain new and useful Improvements in Valve-Reseating Devices; and I do hereby declare the following to be a full, clear, and exact description of the same, reference being had to the accompanying drawings, forming a part of this specification, and to the reference-numerals marked thereon.

My present invention has for its object to provide an apparatus for reseating the seats of valves, which is cheap and simple in construction, and readily adapted to operate upon valves of any size whether the cap or gland through which the valve stem passes is interiorly or exteriorly threaded, and it consists in certain improvements in construction and combinations of parts, all as will be hereinafter fully described and the novel features pointed out in the claims at the end of this specification.

Figure 1:
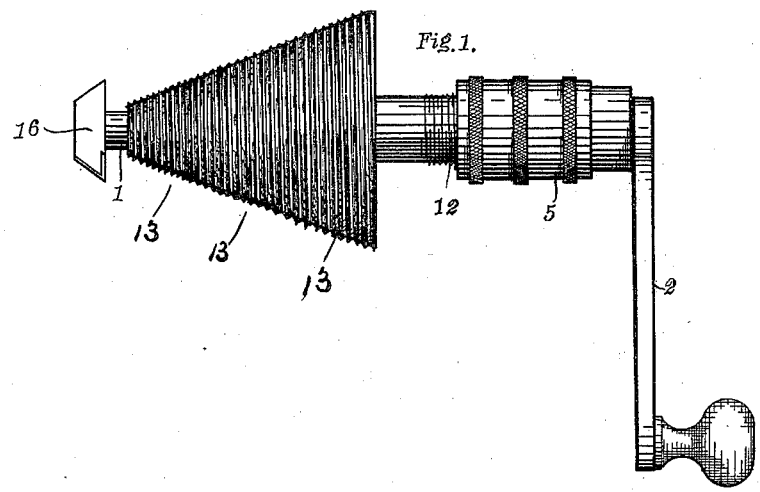
Figure 2:
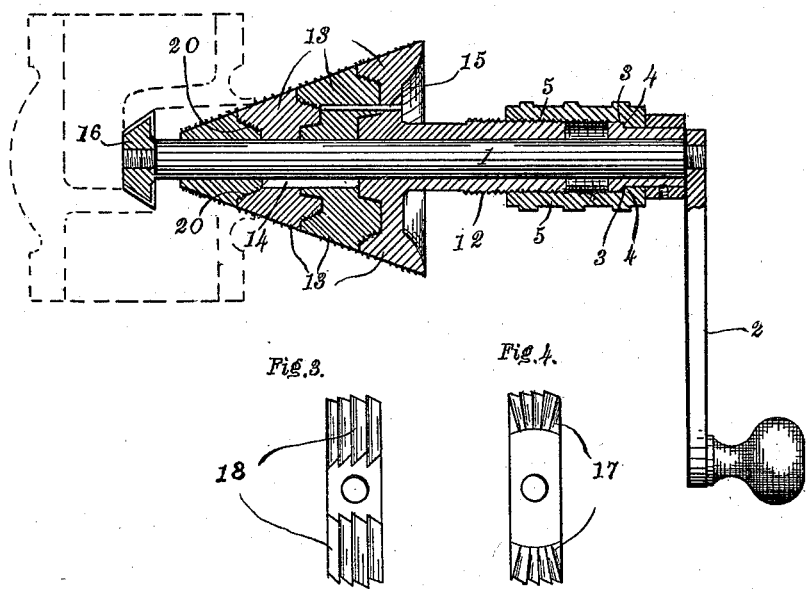
Figure 3:
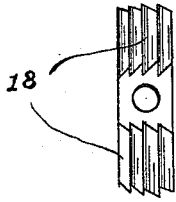
Figure 4:
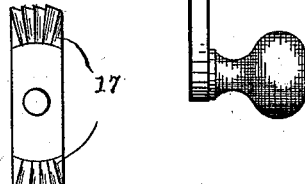

In the accompanying drawings, Figure 1 is a side elevation of the device; Fig. 2, a longitudinal sectional view showing the device operating upon the seat of a globe-valve, being connected to the casing or hood of the latter. Figs. 3 and 4 are views of opposite sides of the cutting-tool employed, which is capable of reseating either flat or tapering valve-seats.

Similar reference-numerals in the several figures indicate similar parts.

The spindle or shaft of the device, indicated by 1, is provided at its outer end with an operating handle 2, and inside this with a collar 3, with which co-operates a collar 4, on a sleeve 5 provided with an internal screw thread. The inner end of the spindle or shaft is preferably reduced and threaded, as shown, for the application of the cutting tool.

In order that the valve seats of globe valves may be milled, ground or trued up, it is necessary that the sleeve forming the bearing for the spindle be capable of attachment to any and all kinds of valve hoods or casings, and for this purpose I provide the arrangement shown in Fig. 1, and consisting of a tapering threaded frame or plug in which the cutter spindle has a bearing and upon which is provided a screw thread 12 with which the feed sleeve 5 on the spindle co-operates, said frame consisting of several sections 13 secured rigidly together.

Each of the sections 13 excepting the smallest has upon its smaller side a tapering recess having a female thread 20 therein with which co-operates a corresponding male thread formed upon the tapered rear side of each succeeding section, said internal thread 20 not only forming the means of connection between the various sections, as shown in Fig. 2, but also as a means of attaching the device to a valve casing having an external thread for the application of the cap for carrying its valve spindle,—it being understood that when the device is to be attached to a valve casing of this description, one or more of the smaller sections 13 are removed and the tapered internal thread 20 on the last section engages the external thread on said valve casing.

When the sections of the frame or plug are screwed together, as shown, there is a continuous external thread extending from end to end thereof, and said sections are further secured from independent movement by means of pins 14 and 15, as shown in said Fig. 2, the pin 14 fastening the three smaller sections together, and the pin 15 securing the larger section to the last one of the small ones, but this arrangement may be varied as desired.

It will be understood that the sections of the conical plug 11 being secured together the spindle 1 is passed through them and a cutter 16 is screwed upon its outer end. Then the conical plug is secured to the valve hood or casing and the spindle rotated, the feed of the spindle and cutter being accomplished by the threaded sleeve 5.

It will be understood that by making the conical frame in sections, it is applicable to all kinds of valve casings for large valves, it being only necessary to remove the smaller sections as there may not be room in the casing for their accommodation.

The cutter, shown in Figs. 3 and 4, is constructed of a strip of steel provided with a central threaded aperture for attaching it to the spindle, the ends being tapered toward one side and provided with cutting teeth 17, the flat face being also provided with teeth 18 so that said cutter may be reversed on the spindle, and either flat or conical seats faced, as desired. By making this cutter in the form of a strip, as shown, instead of a disk, it will be understood that it can be more readily inserted in valve casings in which the aperture above the seat is smaller than the seat itself, which would be impossible with a circular cutter.

The advantages incident to the use of this tool as constructed will be apparent to those skilled in the art, as it is cheap and easily manufactured, and is readily adapted to refit any kind of valve, the necessary milling or cutting tools being properly shaped.

I claim as my invention—

1. The combination with the conical frame constructed in sections removably connected together, and threaded on its exterior for engaging the casing of a valve, of a spindle passing through said frame and carrying a milling tool, and an operating handle, and feeding devices between said frame and the spindle, substantially as described.

2. The combination with the conical frame constructed of sections removably connected and threaded upon its exterior for engagement with a valve casing, said sections having on their smaller ends internally threaded tapering recesses, of a spindle having an operating handle, and passing through said frame, a milling tool thereon, and feeding devices for causing the longitudinal movement of the spindle, substantially as described.

3. A frame for supporting a cutter spindle having the exteriorly threaded conical surface and made in sections, the sections intermediate the first and last having conical internally threaded recesses in the smaller ends, and externally threaded tapering portions on the larger ends, substantially as described.

4. A frame for supporting a cutter-spindle having an exteriorly threaded conical surface, and made in sections, the sections intermediate the first and last having the tapering threaded recesses in their smaller ends and corresponding tapering threaded projections on their larger ends, and securing devices, as pins 14 and 15, for preventing their independent rotation, substantially as and for the purpose specified.

5. The combination with the conical frame having an exterior threaded conical surface and made in sections, the larger section having the extension on one end provided with the thread 12, and the tapering threaded recess on the other end, and the succeeding sections having the tapering threaded recesses on their smaller end and the corresponding tapering projections on their larger ends, of the spindle, a milling tool carried thereby, and the feeding sleeve loosely engaging the spindle and screwing upon the thread 12 on the frame, substantially as described.

NERI E. SHONTZ.

Witnesses:
BENJAMIN FRANKLIN,
F. F. CHURCH.